United States Patent
Paek et al.

(10) Patent No.: US 9,919,711 B2
(45) Date of Patent: *Mar. 20, 2018

(54) AMBIENT VEHICLE AND PEDESTRIAN STATE DETECTION FOR DEVICE NOTIFICATION

(71) Applicant: Microsoft Technology Licensing, LLC, Redmond, WA (US)

(72) Inventors: Timothy S. Paek, Sammamish, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,540

(22) Filed: Aug. 15, 2016

(65) Prior Publication Data

US 2016/0355188 A1     Dec. 8, 2016

Related U.S. Application Data

(63) Continuation of application No. 14/788,328, filed on Jun. 30, 2015, now Pat. No. 9,487,215, which is a continuation of application No. 13/533,119, filed on Jun. 26, 2012, now Pat. No. 9,165,463.

(51) Int. Cl.
| | |
|---|---|
| *G08B 23/00* | (2006.01) |
| *B60W 40/04* | (2006.01) |
| *G08G 1/0962* | (2006.01) |
| *B60W 40/08* | (2012.01) |

(52) U.S. Cl.
CPC ............ *B60W 40/04* (2013.01); *B60W 40/08* (2013.01); *G08G 1/0962* (2013.01); *B60W 2040/0818* (2013.01)

(58) Field of Classification Search
CPC ............................... G08G 1/00; G08G 1/0962
USPC .......................... 340/903, 901, 435, 995, 990
See application file for complete search history.

(56) References Cited

U.S. PATENT DOCUMENTS

| | | | |
|---|---|---|---|
| 6,850,269 | B2 | 2/2005 | Maguire |
| 7,126,583 | B1 | 10/2006 | Breed |
| 7,227,453 | B2 | 6/2007 | Arunkumar |
| 8,706,143 | B1 | 4/2014 | Elias |
| 9,165,463 | B2 | 10/2015 | Paek et al. |
| 9,487,215 | B2 * | 11/2016 | Paek .................... G08G 1/0962 |
| 2006/0015245 | A1 | 1/2006 | Janssen |
| 2006/0103590 | A1 | 5/2006 | Divon |
| 2007/0276581 | A1 | 11/2007 | Bae |

(Continued)

OTHER PUBLICATIONS

"Non-Final Office Action Issued in U.S. Appl. No. 13/533,119", dated Sep. 22, 2014, 8 Pages.

(Continued)

*Primary Examiner* — Daryl Pope (57) ABSTRACT

Described is a technology by which ambient data related to a vehicle is sensed and processed, for use in determining a state change related to external traffic awareness. Based upon the state change, an allowed level of interactivity with a user interface may be changed, and/or a notification may be output. Images and/or depth data may be sensed as part of determining whether a user who is interacting with a device in a stopped vehicle is to be made aware of the changed condition with respect to other vehicles, pedestrians and/or the like.

20 Claims, 4 Drawing Sheets

(56) References Cited

U.S. PATENT DOCUMENTS

| | | |
|---|---|---|
| 2010/0253918 A1 | 10/2010 | Seder et al. |
| 2010/0254282 A1 | 10/2010 | Chan et al. |
| 2011/0021234 A1 | 1/2011 | Tibbitts et al. |
| 2011/0095908 A1 | 4/2011 | Nadeem et al. |
| 2011/0169626 A1 | 7/2011 | Sun et al. |
| 2011/0263293 A1 | 10/2011 | Blake et al. |
| 2012/0313770 A1 | 12/2012 | Zeiger et al. |
| 2013/0038437 A1 | 2/2013 | Talati et al. |
| 2014/0152430 A1 | 6/2014 | Ohki |

OTHER PUBLICATIONS

"Notice of Allowance Issued in U.S. Appl. No. 13/533,119", dated Jan. 16, 2015, 5 Pages.

"Notice of Allowance Issued in U.S. Appl. No. 13/533,119", dated Apr. 1, 2015, 5 Pages.

"Notice of Allowance Issued in U.S. Appl. No. 13/533,119", dated Sep. 25, 2015, 3 Pages.

"Non Final Office Action Issued in U.S. Appl. No. 14/788,328", dated Nov. 30, 2015, 6 Pages.

"Notice of Allowance Issued in U.S. Appl. No. 14/788,328", dated Jul. 7, 2016, 7 Pages.

Gregory, Nina, "The Next Workplace? Behind the Wheel", Retrieved from <<http://www.npr.org/sections/alltechconsidered/2012/12/03/166230794/the-next-workplace-behind-the-wheel>>, Dec. 3, 2012, 4 Pages.

Lyden, Sean, "6 Mobile Applications to Prevent Distracted Driving Accidents", Retrieved from <<http://www.automotive-fleet.com/article/story/2011108/6-mobile-applications-to-prevent-distracted-driving-accidents.aspx>>, Aug. 2011, 9 Pages.

Mohan, et al., "Nericell: Rich Monitoring of Road and Traffic Conditions using Mobile Smartphones", In Proceedings of 6th ACM Conference on Embedded Network Sensor Systems, Nov. 5, 2008, 14 Pages.

Newcomb, Deug, "The Next Big OS War Is in Your Dashboard", Retrieved from <<http://www.wired.com/2012/12/automotive-os-war/all/>>, Mar. 12, 2012, 14 Pages.

Wang, et al., "A Framework of Energy Efficient Mobile Sensing for Automatic User State Recognition", In Proceedings of 7th Annual International Conference on Mobile Systems, Applications and Services, Jun. 22, 2009, 14 Pages.

Work, et al., "Impacts of the Mobile Internet on Transportation Cyberphysical Systems: Traffic Monitoring using Smartphones", In Proceedings of National Workshop for Research on High-Confidence Transportation Cyber-Physical Systems: Automotive, Aviation and Rail, Nov. 18, 2008, 3 Pages.

\* cited by examiner

AMBIENT VEHICLE AND PEDESTRIAN STATE DETECTION FOR DEVICE NOTIFICATION

CROSS-REFERENCE TO RELATED APPLICATION

This application is a continuation of U.S. patent application Ser. No. 14/788,328, filed Jun. 30, 2015, entitled "Ambient Vehicle and Pedestrian State Detection for Device Notification", which is a continuation of U.S. patent application Ser. No. 13/533,119, filed Jun. 26, 2012, entitled "Ambient Vehicle and Pedestrian State Detection for Device Notification," the entirety of both which are incorporated herein by reference.

BACKGROUND

When a driver is stopped, he or she often interacts with a mobile device. At such a time, the driver is unaware of the state of other vehicles and/or pedestrians around his or her vehicle. Driver distraction is often evident when a red light changes to green and a car does not move when even when cars in front have moved forward.

Accidents with pedestrians as well as vehicles are another concern with distracted drivers. A driver may react suddenly and move forward upon realizing that he or she is supposed to be moving forward at the time, possibly as a result of a honking horn from a driver behind. However, such a sudden movement can be dangerous. Any technology that assists drivers with respect to safe and attentive driving is beneficial.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which one level of interaction with an interactive device is allowed while a vehicle associated with the device is stopped, and a reduced level interaction is provided upon determining an ambient state changing to a sensed condition associated with external traffic awareness. Ambient state relative to the vehicle is sensed to determine the state change, and a notification may be output to notify the user of the state change.

In one aspect, a sensor set provides data to detection and notification logic of a device associated with a user vehicle. The detection and notification logic is configured to process sensed data from the sensor set, including determining a state change associated with an external traffic awareness state. Upon determination of the state change, the detection and notification logic outputs a notification to the automotive user interface. The detection and notification logic may change an allowed level of user interaction with the automotive user interface based upon the detection of the state change.

The sensor set may comprise a camera, which may capture frames of depth data. In one aspect, depth data is processed depth data to determine a state change related to external traffic awareness. Based upon the state change, an allowed level of interactivity with a user interface may be changed, and/or a notification may be output.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards monitoring ambient activity (e.g., external traffic and pedestrians) near a user's vehicle so as to notify the user as to a state change with respect to the activity. For example, a mobile device gracefully ceases interaction with the user so that the user can attend to the task of safe driving. If there are pedestrians in the area, the technology notifies the user, possibly in a different way, so as to avoid overly quick acceleration.

It should be understood that any of the examples herein are non-limiting. For one, while a mobile device is used as an example of a suitable device for implementing the technology described herein, a more stationary (e.g., built-in or partially built-in) device may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computer-related user interaction and notification in general.

Figure 1:
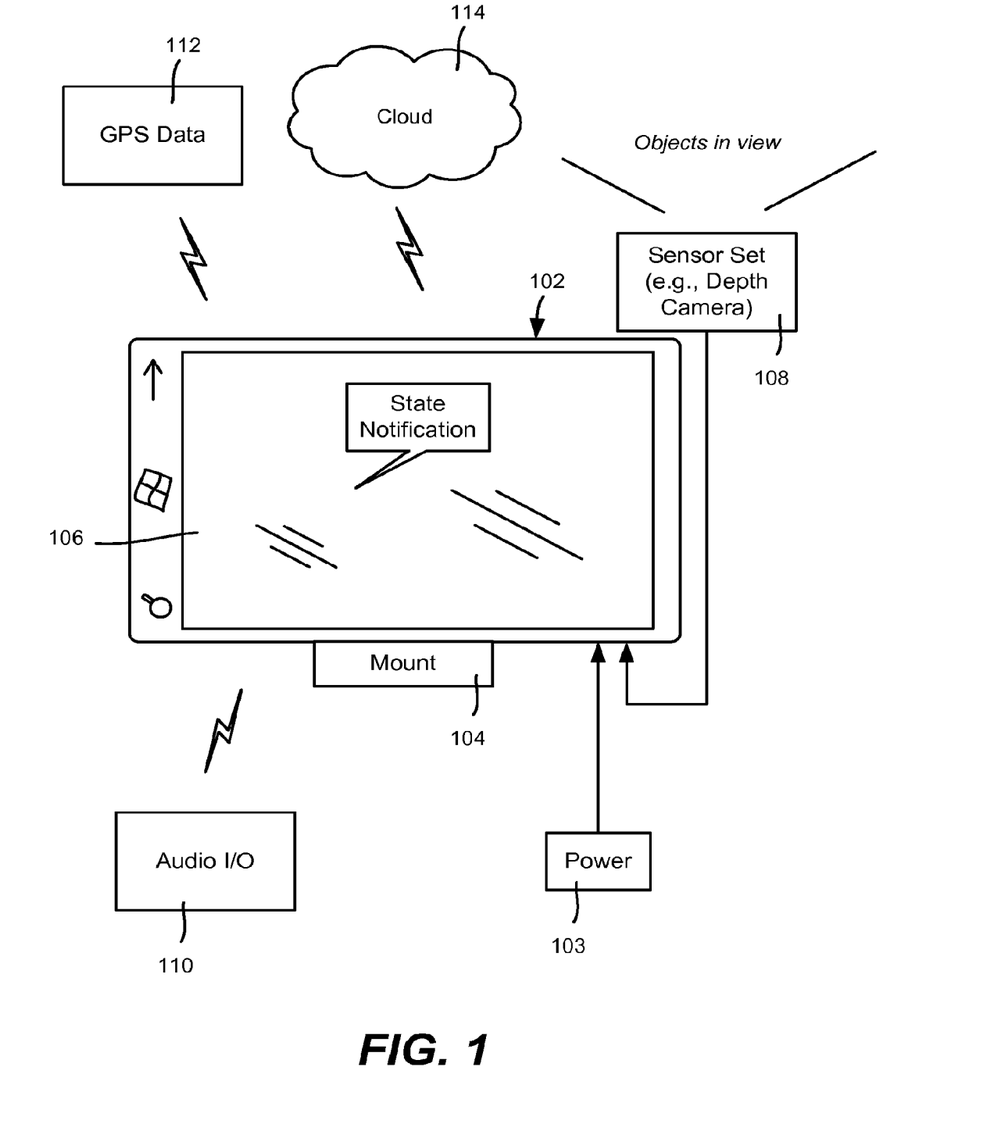
FIG. 1 is a representation of an example device coupled to various components to detect and take action upon ambient state related to a vehicle, according to one example embodiment.

FIG. 1 shows a block diagram comprising an example implementation in which a mobile device 102 such as a user's cellular phone is coupled to a vehicle dashboard via a suitable mount 104. The mount 104 may include an interface such that when mounted, the device 102 receives power 103 and may be coupled to other input and/or output mechanisms. Alternatively, a separate interface such as a physical connector (e.g., to the device's USB interface) may be used for power and/or other input/output.

In the example implementation of FIG. 1, automotive user interface 106 by which input is received and output is rendered comprises the touch-sensitive display screen of the device 102. However, as can be readily appreciated, various alternative implementations may be used to implement the technology described herein. For example, a typical built-in vehicle navigation or entertainment system already provides a display screen and interactive capabilities, whether via a touch-sensitive screen or by controls (e.g., buttons) for navigating a set of menus and the like, and such a system may be coupled to sources of data and programmed to input and output information as described herein. As also described herein, speech may be used to provide input, audio (e.g., spoken notifications) may be output, and so forth. The display may be a heads-up display in another implementation.

As represented in FIG. 1, a sensor set 108 such as comprising one or more cameras, one or more depth cameras and/or other types of sensors (e.g., motion sensors) provides input to the device 102. The sensor set 108 may comprise the built-in rear-facing camera of the mobile device 102, potentially augmented with an extra camera for depth information, for example. Alternatively, an external sensor or multiple external sensors may provide the information regarding objects (e.g., other vehicles, pedestrians, animals and things like shopping carts) that can be sensed, e.g., "in view" of the sensor set.

Processing of the input data allows monitoring for and detection of various state information, including red brake lights of vehicles in front disappearing (indicating that traffic is likely moving), and/or a traffic light switching from red to green (or to a green arrow) and objects such as pedestrians coming into the field of view.

To increase precision, the sensor set 108 may comprise a depth-sensing camera, which provides depth data for analysis. For example, instead of relying solely on color changes, which may or may not be definitive, sensing that a large object (e.g., another car) in front of the user's vehicle has increased its distance is a likely indication that traffic has started moving. Similarly, a pedestrian in the field of view actually may be far away, such as crossing at the next light; without depth information, it is likely more difficult for image processing to determine such a state.

By monitoring ambient traffic and pedestrians, an automotive user interface 106 is able to control user interface behavior such as to disallow user interface interaction while notifying users to moving traffic ahead so that drivers can pay attention to the task of safe driving. The automotive user interface 106 may alert users to pedestrians trying to cross, so that users do not suddenly accelerate.

Figure 2:
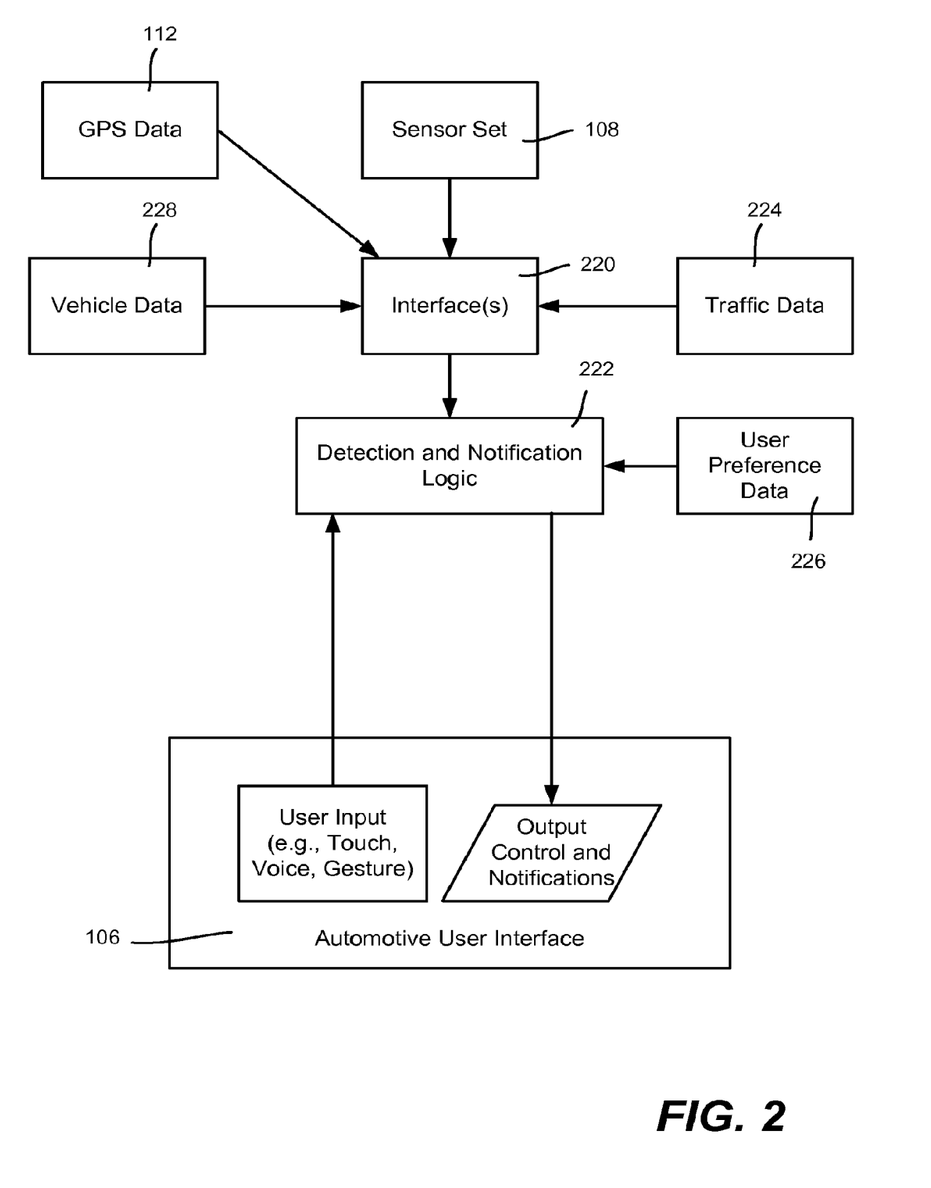
FIG. 2 is a block diagram of example components and data used in detecting and take action upon an ambient state change related to a vehicle, according to one example embodiment.

FIG. 2 is a block diagram representing example components of one embodiment. In FIG. 2, the sensor set 108 provides input via a suitable interface (of a set of one or more interfaces 220) to detection and notification logic 222 running on the device. As set forth above, the sensor set 108 may comprise a device camera (if present), an accessory component, an external (e.g., vehicle mounted) camera and/or sensor, and so forth, or any combination thereof.

In general, the detection and notification logic 222 processes the sensed data from the sensor set 108 to determine a current situational state, and controls the automotive user interface 106 based upon that state. This may include allowing interaction while stopped, and upon a state change indicating the user needs to pay attention to driving, disabling interaction until a later time, and/or outputting visible, audio and/or tactile information (or anything else capable of being sensed by a user, such as blacking out a screen display) to notify the user of the state change. For example, a graceful way to notify a user may be to fade out or slide out the currently displayed output and fade in or slide in an actual camera view of what is ahead of the vehicle. A border may gradually change from glowing red to glowing green. Audio 110 (e.g., shown as wireless such as via Bluetooth® but alternatively wired) may be output in the form of a voice, song or one or more tones may alert the user of the state change, the vehicle seat and/or steering wheel may vibrate, and/or the like.

As represented in FIGS. 1 and 2, other inputs to device 102 may be used in the decision making process. For example, GPS data 112 may indicate that the user is stopped on a highway, and not at a stoplight. If so, traffic data 224 (e.g., from the cloud 114, FIG. 1, or other remote source) may be accessed to determine whether this is going to be a long duration stop or not, and if long, may allow interaction. Pedestrian-sensing sensitivity may be reduced for a highway situation versus increased for city driving.

Other data that may be input includes user preference data 226, which may be stored in the cloud 114 (FIG. 1), on the device and/or in another memory, such as in the vehicle's memory or an accessory's memory. For example, one user may want a faster notification than another user, and/or more sensitivity, e.g., allow ten feet versus five feet before notifying, which also may be based upon various conditions, such as passengers in the car, night versus day, heavy versus light traffic, and so on. A user may want some types of interaction allowed and others blocked, e.g., navigation-related and hands free calling may be allowed, but not texting. A user may want one set of "interaction-allowed" rules for one person and a different set of rules for others, e.g., the vehicle owner versus his teenage son.

Yet another set of possible input data is vehicle-related data 228. For example, if a vehicle is put in park, different rules may apply. For example, a mother may allow her own phone to be interacted with when stopped, but not her teenaged driver's phone, unless the vehicle is also put in park. If there is a passenger present, the rules and/or timing may change. Speed may be determined by processing a camera's images over successive frames, but it not available, GPS data may be used, or the speed of the vehicle may be detected by coupling the device to input the speedometer/corresponding vehicle computer data, or to a radar-based or laser-based device or the like.

Another aspect is directed towards calibrating the "normal" parked or stopped state for a vehicle. For example, some older vehicles bounce around significantly when the engine is on (e.g., running roughly) and the vehicle is otherwise stopped. If such motion otherwise is sensed and/or corresponds to object movement, the "stopped" state for the car may be calibrated to this "normal" state. As one example use, this compensates for a situation in which a stationary object such as a lamppost appears to be moving because the vehicle is stopped but bouncing around.

Figure 3:
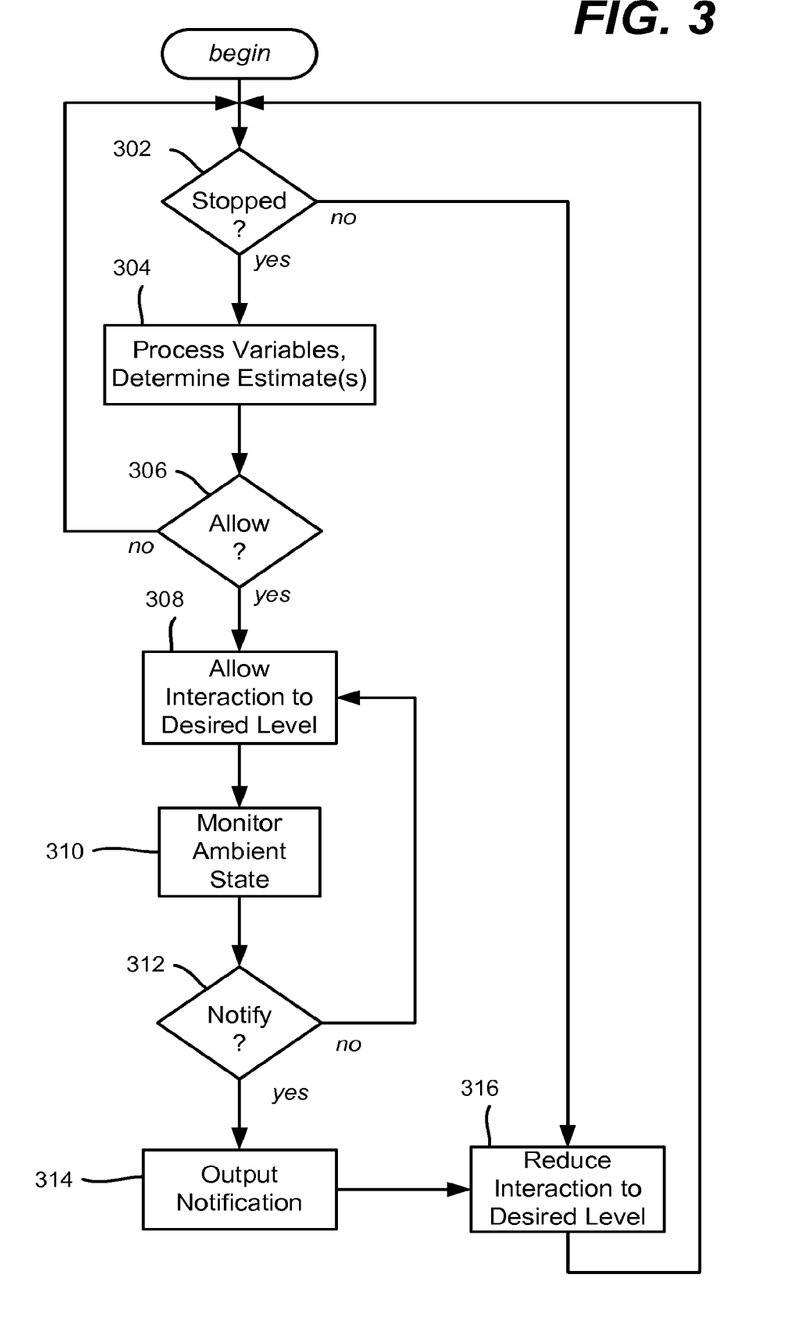
FIG. 3 is a flow diagram representing example steps that may be taken to detect and act upon ambient state changes related to a vehicle, according to one example embodiment.

FIG. 3 is an example flow diagram directed towards processing by the detection and notification logic 222 based upon sensing ambient conditions. In one implementation, a straightforward rule-based decision making classifier may be used in conjunction with image/depth data processing. In other implementations, machine training/learning may be used to build a classifier.

Step 302 represents the logic determining from input whether the vehicle is stopped or moving, e.g., by processing successive images over time, or from GPS data. If moving, step 302 branches to step 316, which in this example reduces interaction to only certain activities such as hands-free calling, or possibly some map interaction, but in another example may fully disable interaction. Note that if already in the disabled state, step 302 can wait for the car to stop moving instead of branching to step 316, which loops back to step 302. Further note that that some of the steps in FIG. 3 are shown as looping for purposes of illustration, however it can be readily appreciated that instead of looping, an event-driven model may be used instead of or in addition to looping.

If the car is stopped, step 302 instead branches to step 304 where the logic may perform computations and the like on the various variable data to determine whether to allow interaction and if so, (possibly) to what extent. For example, as described above, whether the user is on a highway or stopped at a light may be a determining factor as to whether to allow or deny interaction (or allow enhanced interaction to a desired enablement level, e.g., all or only certain programs can be interacted with by a user. Other factors, including those exemplified above, may be used in the decision making process, e.g., whether the stop is long enough such as highway and very heavy traffic, a blinking red stoplight versus a fixed red light, and so on. If not allowed as evaluated at step 306, step 306 returns to step 302 in this example, so that as long the vehicle remains stopped, the variables may change to allow interaction, e.g., the user may put the vehicle into park.

If allowed, step 308 represents allowing the interaction to a desired extent, which as described above, may be an enhanced level of interaction. While allowed, steps 310 and 312 represent monitoring the ambient state for a change indicative of a need to pay attention to driving. For example, an image may be processed to recognize a stoplight's color, which may be tracked in a camera's field of view over time, to determine when the light changes from red to green. Similarly, one or more brake lights may be detected as on, then turning to off, for example. Depth data may be used to determine changes in distances to objects in front of the vehicle, as well as movement in front, such as pedestrian and cross traffic. Rules may coded into the logic and/or a classifier trained as part of the logic to provide one or more notifications (step 314) based upon transition detection from red light to green light, red brake light or lights on to off, a distance to an object that is constant for a period of time transitioning to a larger distance (or growing to larger and larger), the absence of sensed pedestrian traffic and cross-traffic, and so forth. Note that pedestrian and smaller object sensing may be a separate part of the computation. Depth data may be particularly useful in such sensing, as pedestrians and objects can move in front of a vehicle but then stop; red light or brake light sensing may not be ideal if used alone in such a situation.

When the state transition is detected that indicates that the user needs to pay attention to driving, step 312 branches to step 314 to output the notification or notifications, such as using any combination of animation, special effects, graphics, video, audio, haptic feedback and so forth. After or as part of the notification, step 314 branches to step 316 to disable the interaction to a desired disablement level, e.g., only certain programs, if any, may be interacted with. Some delay may be built into the notification process to allow the user time to react before returning to step 302.

Example Operating Environment

Figure 4:
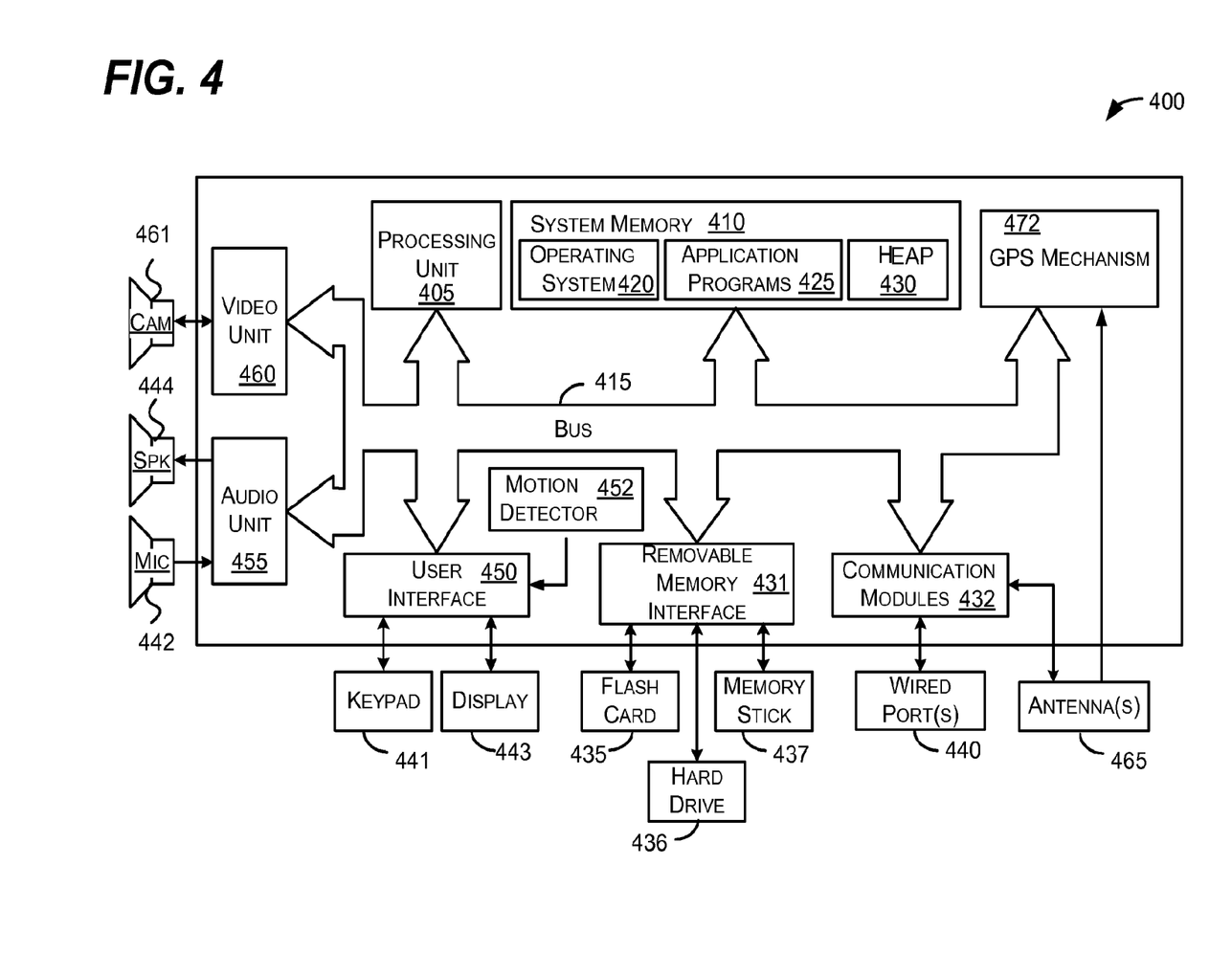
FIG. 4 is a block diagram representing an example computing environment, in the form of a mobile device, into which aspects of the subject matter described herein may be incorporated.

FIG. 4 illustrates an example of a suitable mobile device 400 on which aspects of the subject matter described herein may be implemented. The mobile device 400 is only one example of a device and is not intended to suggest any limitation as to the scope of use or functionality of aspects of the subject matter described herein. Neither should the mobile device 400 be interpreted as having any dependency or requirement relating to any one or combination of components illustrated in the example mobile device 400.

With reference to FIG. 4, an example device for implementing aspects of the subject matter described herein includes a mobile device 400. In some embodiments, the mobile device 400 comprises a cell phone, a handheld device that allows voice communications with others, some other voice communications device, or the like. In these embodiments, the mobile device 400 may be equipped with a camera for taking pictures, although this may not be required in other embodiments. In other embodiments, the mobile device 400 may comprise a personal digital assistant (PDA), hand-held gaming device, notebook computer, printer, appliance including a set-top, media center, or other appliance, other mobile devices, or the like. In yet other embodiments, the mobile device 400 may comprise devices that are generally considered non-mobile such as personal computers, servers, or the like.

Components of the mobile device 400 may include, but are not limited to, a processing unit 405, system memory 410, and a bus 415 that couples various system components including the system memory 410 to the processing unit 405. The bus 415 may include any of several types of bus structures including a memory bus, memory controller, a peripheral bus, and a local bus using any of a variety of bus architectures, and the like. The bus 415 allows data to be transmitted between various components of the mobile device 400.

The mobile device 400 may include a variety of computer-readable media. Computer-readable media can be any available media that can be accessed by the mobile device 400 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 400.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 410 includes computer storage media in the form of volatile and/or nonvolatile memory and may include read only memory (ROM) and random access memory (RAM). On a mobile device such as a cell phone, operating system code 420 is sometimes included in ROM although, in other embodiments, this is not required. Similarly, application programs 425 are often placed in RAM although again, in other embodiments, application programs may be placed in ROM or in other computer-readable memory. The heap 430 provides memory for state associated with the operating system 420 and the application programs 425. For example, the operating system 420 and application programs 425 may store variables and data structures in the heap 430 during their operations.

The mobile device 400 may also include other removable/non-removable, volatile/nonvolatile memory. By way of example, FIG. 4 illustrates a flash card 435, a hard disk drive 436, and a memory stick 437. The hard disk drive 436 may be miniaturized to fit in a memory slot, for example. The mobile device 400 may interface with these types of non-volatile removable memory via a removable memory interface 431, or may be connected via a universal serial bus (USB), IEEE 4394, one or more of the wired port(s) 440, or antenna(s) 465. In these embodiments, the removable memory devices 435-437 may interface with the mobile device via the communications module(s) 432. In some embodiments, not all of these types of memory may be included on a single mobile device. In other embodiments, one or more of these and other types of removable memory may be included on a single mobile device.

In some embodiments, the hard disk drive 436 may be connected in such a way as to be more permanently attached to the mobile device 400. For example, the hard disk drive 436 may be connected to an interface such as parallel advanced technology attachment (PATA), serial advanced technology attachment (SATA) or otherwise, which may be connected to the bus 415. In such embodiments, removing the hard drive may involve removing a cover of the mobile device 400 and removing screws or other fasteners that connect the hard drive 436 to support structures within the mobile device 400.

The removable memory devices 435-437 and their associated computer storage media, discussed above and illustrated in FIG. 4, provide storage of computer-readable instructions, program modules, data structures, and other data for the mobile device 400. For example, the removable memory device or devices 435-437 may store images taken by the mobile device 400, voice recordings, contact information, programs, data for the programs and so forth.

A user may enter commands and information into the mobile device 400 through input devices such as a key pad 441 and the microphone 442. In some embodiments, the display 443 may be touch-sensitive screen and may allow a user to enter commands and information thereon. The key pad 441 and display 443 may be connected to the processing unit 405 through a user input interface 450 that is coupled to the bus 415, but may also be connected by other interface and bus structures, such as the communications module(s) 432 and wired port(s) 440. Motion detection 452 can be used to determine gestures made with the device 400.

A user may communicate with other users via speaking into the microphone 442 and via text messages that are entered on the key pad 441 or a touch sensitive display 443, for example. The audio unit 455 may provide electrical signals to drive the speaker 444 as well as receive and digitize audio signals received from the microphone 442.

The mobile device 400 may include a video unit 460 that provides signals to drive a camera 461. The video unit 460 may also receive images obtained by the camera 461 and provide these images to the processing unit 405 and/or memory included on the mobile device 400. The images obtained by the camera 461 may comprise video, one or more images that do not form a video, or some combination thereof.

The communication module(s) 432 may provide signals to and receive signals from one or more antenna(s) 465. One of the antenna(s) 465 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 472. In turn, the GPS mechanism 472 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 400 may connect to one or more remote devices. The remote devices may include a personal computer, a server, a router, a network PC, a cell phone, a media playback device, a peer device or other common network node, and typically includes many or all of the elements described above relative to the mobile device 400.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   allowing a first level of user interaction with an interactive device while a vehicle associated with the interactive device is moving;
   monitoring ambient activity relative to the vehicle based on data received from one or more sensors, the ambient activity corresponding to external traffic awareness;
   based on the data received from the one or more sensors, determining a change with respect to the ambient activity indicating the vehicle is not moving; and
   based on the determined change, allowing a second level of user interaction with the interactive device while the vehicle is not moving.

2. The method of claim 1, further comprising calibrating a stopped state for the vehicle when the vehicle is not moving.

3. The method of claim 1, wherein determining the change with respect to the ambient activity indicating the vehicle is not moving further comprises receiving information from a global positioning system.

4. The method of claim 1, wherein allowing the second level of user interaction with the interactive device further comprises changing the first level of user interaction to the second level of user interaction, wherein the user interaction with at least one program is not allowed at the first level of user interaction, and wherein the user interaction with the at least one program is allowed at the second level of interaction.

5. The method of claim 1, wherein determining the change with respect to the ambient activity further comprises processing the data received from the set of sensors to detect a change in a state of at least one brake light of another vehicle.

6. The method of claim 1, wherein monitoring the ambient activity relative to the vehicle further comprises:
   capturing depth data from a depth camera; and
   processing the depth data to determine that an object has decreased its depth relative to the vehicle over time.

7. The method of claim 1, wherein determining the change with respect to the ambient activity further comprises changing the first level of user interaction to the second level of user interaction based on a set of interaction-allowed rules.

8. The method of claim 1, wherein ambient activity comprises pedestrian sensing, and wherein the method further comprising:
   reducing pedestrian sensing sensitivity for a highway situation; and
   increasing the pedestrian sensing sensitivity for city driving.

9. The method of claim 1, further comprising allowing a third level of user interaction with the interactive device while the vehicle associated with the interactive device is in park mode, the park mode different from the vehicle being stopped.

10. The method of claim 1, wherein the second level of user interaction and the third level of user interaction are allowed when the vehicle is in the park mode.

11. A system comprising:
    an interactive device associated with a vehicle, the interactive device providing a first level of interaction while the vehicle is stopped and a second level of user interaction with the interactive device while the vehicle is moving;
    one or more sensors for detecting ambient activity relative to the vehicle; and
    a processor programmed to:
       allow the second level of user interaction with the interactive device while the vehicle associated with the interactive device is moving;
       monitor ambient the activity relative to the vehicle based on data received from the one or more sensors;
       based on the data received from the one or more sensors, determine a change with respect to the ambient activity indicating the vehicle is not moving; and
       based on the determined change, allow the first level of user interaction with the interactive device while the vehicle is not moving.

12. The system of claim 11, wherein determining the change with respect to the ambient activity indicating the vehicle is not moving further comprises receiving information from a global positioning system.

13. The system of claim 11, wherein allowing the second level of user interaction with the interactive device further comprises changing the first level of user interaction to the second level of user interaction, wherein the user interaction with at least one program is not allowed at the first level of user interaction, and wherein the user interaction with the at least one program is allowed at the second level of interaction.

14. The system of claim 11, wherein the ambient activity comprises at least one sensed object coming within a field of view of the vehicle, the at least one sensed object comprising a pedestrian or an animal.

15. The system of claim 11, wherein the one or more sensors comprises at least one depth sensor configured to capture depth data.

16. One or more computer-readable storage devices having computer-executable instructions, which when executed cause at least one processor to:
    allow a first level of user interaction with the interactive device while the vehicle associated with the interactive device is moving;
    monitor ambient activity relative to the vehicle based on data received from one or more sensors;
    based on the data received from the one or more sensors, determine a change with respect to the ambient activity indicating the vehicle is not moving; and
    based on the determined change, allow a second level of user interaction with the interactive device while the vehicle is not moving.

17. The one or more computer-readable storage devices of claim 16, wherein the computer executable instructions are executed to further cause the at least one processor to sense an object coming within a field of view of the vehicle, wherein the sensed object comprises a pedestrian or an animal.

18. The one or more computer-readable storage devices of claim 16, wherein determining the change with respect to the ambient activity indicating the vehicle is not moving further comprises receiving information from a global positioning system.

19. The one or more computer-readable storage devices of claim 16, wherein allowing the second level of user interaction with the interactive device further comprises changing the first level of user interaction to the second level of user interaction, wherein the user interaction with at least one program is not allowed at the first level of user interaction, and wherein the user interaction with the at least one program is allowed at the second level of interaction.

20. The one or more computer-readable storage devices of claim 16, wherein the one or more sensors comprises at least one depth sensor configured to capture depth data.

* * * * *